United States Patent
Satoh et al.

(10) Patent No.: US 11,721,308 B2
(45) Date of Patent: Aug. 8, 2023

(54) INFORMATION PROCESSING APPARATUS AND INFORMATION PROCESSING METHOD

(71) Applicant: SONY CORPORATION, Tokyo (JP)

(72) Inventors: Ayaka Satoh, Tokyo (JP); Tomoko Takahashi, Tokyo (JP); Jiro Kawano, Tokyo (JP); Hiromu Yumiba, Tokyo (JP); Makoto Imamura, Tokyo (JP); Yutaka Hasegawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 17/293,193

(22) PCT Filed: Oct. 7, 2019

(86) PCT No.: PCT/JP2019/039422
§ 371 (c)(1),
(2) Date: May 12, 2021

(87) PCT Pub. No.: WO2020/105299
PCT Pub. Date: May 28, 2020

(65) Prior Publication Data
US 2022/0005442 A1    Jan. 6, 2022

(30) Foreign Application Priority Data

Nov. 21, 2018  (JP) ................. 2018-217959

(51) Int. Cl.
*G09G 5/38*    (2006.01)
*G06T 7/70*    (2017.01)
(Continued)

(52) U.S. Cl.
CPC ............... *G09G 5/38* (2013.01); *G06F 3/011* (2013.01); *G06T 7/70* (2017.01); *G06V 20/00* (2022.01);
(Continued)

(58) Field of Classification Search
CPC . G09G 5/38; G09G 3/002; G06T 7/70; G06V 40/10; G06V 40/161; G06V 40/20; G06V 20/00; G06F 3/011
See application file for complete search history.

(56) References Cited

U.S. PATENT DOCUMENTS

2012/0300086 A1   11/2012  Miyashita et al.
2013/0332892 A1*  12/2013  Matsuki .............. G06F 3/04842
                                                      715/863
(Continued)

FOREIGN PATENT DOCUMENTS

CN    102999450 A   3/2013
CN    103856725 A   6/2014
(Continued)

OTHER PUBLICATIONS

International Search Report and Written Opinion of PCT Application No. PCT/JP2019/039422, dated Dec. 24, 2019, 09 pages of ISRWO.

*Primary Examiner* — Abbas I Abdulselam
(74) *Attorney, Agent, or Firm* — Chip Law Group

(57) ABSTRACT

An information processing apparatus includes a control unit that performs control according to a result of recognition of a user located near a presentation screen on which an object is presented, and a result of detection of a shooting preparation movement of the user, to present a given object such that the given object does not overlap a recognition area of the user.

18 Claims, 15 Drawing Sheets

(51) Int. Cl.
*G06V 40/10* (2022.01)
*G06V 40/16* (2022.01)
*G06V 40/20* (2022.01)
*G06V 20/00* (2022.01)
*G06F 3/01* (2006.01)
*G09G 3/00* (2006.01)

(52) U.S. Cl.
CPC ............ *G06V 40/10* (2022.01); *G06V 40/161* (2022.01); *G06V 40/20* (2022.01); *G09G 3/002* (2013.01); *G06T 2207/30201* (2013.01); *G09G 2340/0464* (2013.01)

(56) References Cited

U.S. PATENT DOCUMENTS

| | | |
|---|---|---|
| 2014/0146024 A1 | 5/2014 | Kamada et al. |
| 2015/0324005 A1 | 11/2015 | Kobayashi et al. |
| 2018/0310046 A1 | 10/2018 | Cullen |

FOREIGN PATENT DOCUMENTS

| | | |
|---|---|---|
| CN | 105100590 A | 11/2015 |
| JP | 2012-247888 A | 12/2012 |
| JP | 2014-106837 A | 6/2014 |
| JP | 2015-215720 A | 12/2015 |
| JP | 2017-090819 A | 5/2017 |
| KR | 10-2015-0108571 A | 9/2015 |
| KR | 10-2018-0017638 A | 2/2018 |
| WO | 2015/098189 A1 | 7/2015 |

\* cited by examiner

FIG. 7
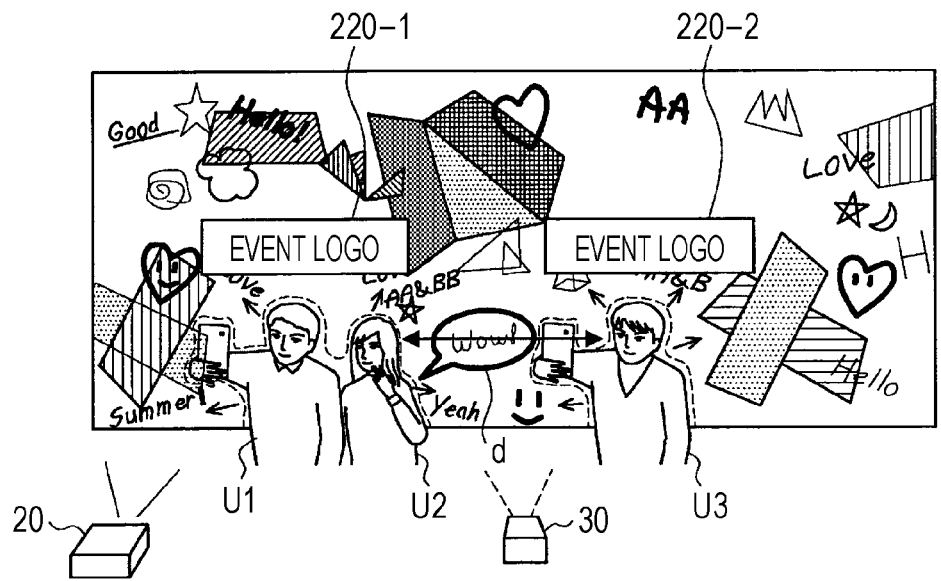
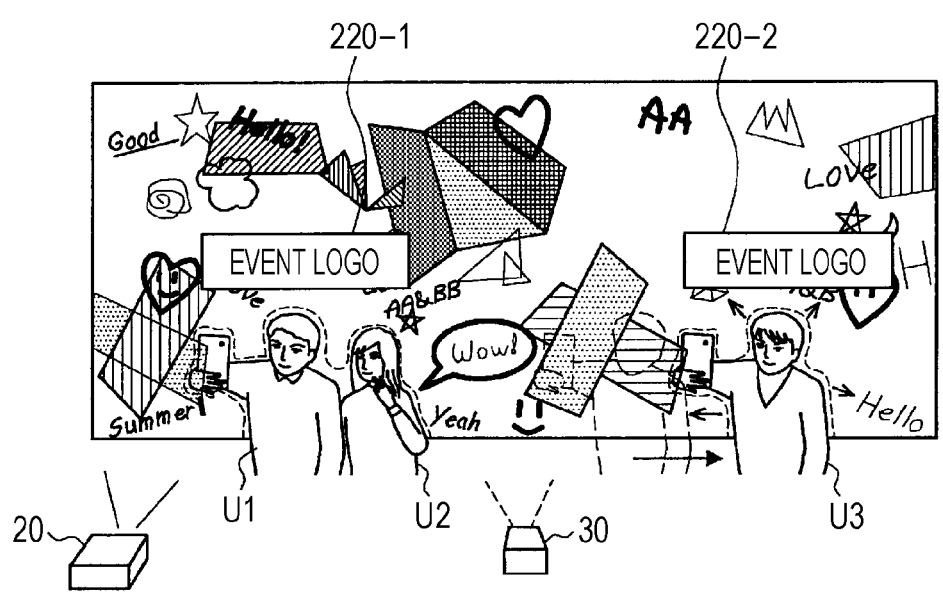

FIG. 8
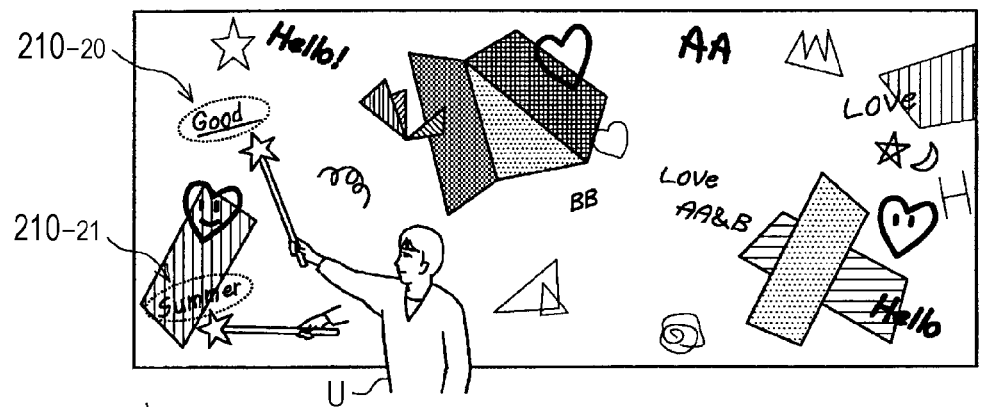
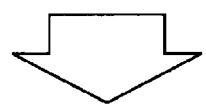
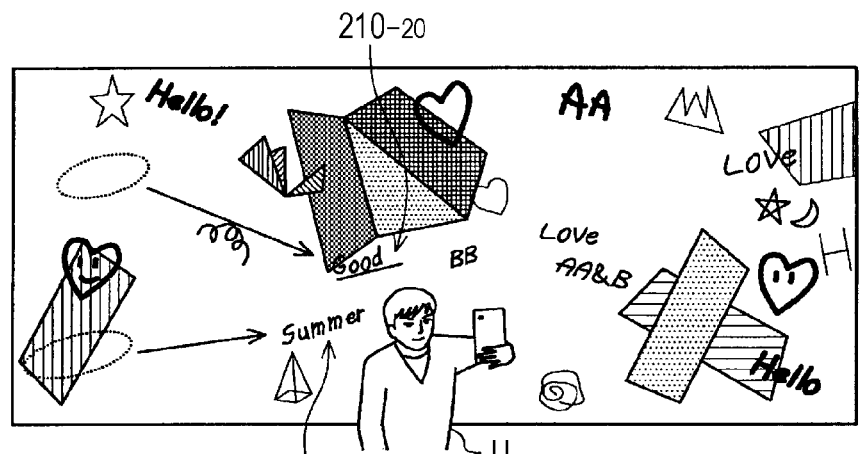

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/039422 filed on Oct. 7, 2019, which claims priority benefit of Japanese Patent Application No. JP 2018-217959 filed in the Japan Patent Office on Nov. 21, 2018. Each of the above-referenced applications is hereby incorporated herein by reference in its entirety.

TECHNICAL FIELD

The present disclosure relates to an information processing apparatus, an information processing method, and a program.

BACKGROUND ART

In recent years, various display devices including fixed display devices such as TV receivers, wall displays (large displays), and projectors, and mobile display devices such as smartphones, tablet terminals, and notebook personal computers (PCs) have been developed.

For example, Patent Document 1 below discloses a system that projects an image onto a table surface with a projector, and detects a touch operation on the table surface and reflects it in the image.

CITATION LIST

Patent Document

Patent Document 1: WO 2015/098189 A

SUMMARY OF THE INVENTION

Problems to be Solved by the Invention

However, when a user is going to take a picture together with an image, the arrangement of individual objects included in the image may be undesirable depending on the user's position.

Solutions to Problems

According to the present disclosure, an information processing apparatus is proposed which includes a control unit that performs control according to a result of recognition of a user located near a presentation screen on which an object is presented, and a result of detection of a shooting preparation movement of the user, to present a given object such that the given object does not overlap a recognition area of the user.

According to the present disclosure, an information processing method is proposed which includes a processor performing control according to a result of recognition of a user located near a presentation screen on which an object is presented, and a result of detection of a shooting preparation movement of the user, to present a given object such that the given object does not overlap a recognition area of the user.

According to the present disclosure, a program is proposed which is for causing a computer to function as a control unit that performs control according to a result of recognition of a user located near a presentation screen on which an object is presented, and a result of detection of a shooting preparation movement of the user, to present a given object such that the given object does not overlap a recognition area of the user.

BRIEF DESCRIPTION OF DRAWINGS

FIG. 7 is a diagram illustrating the presentation of event logo objects in a case where multiple user groups have been recognized according to the present embodiment.

FIG. 8 is a diagram illustrating the selection of objects to shoot according to a first modification of the present embodiment.

MODE FOR CARRYING OUT THE INVENTION

Figure 1:
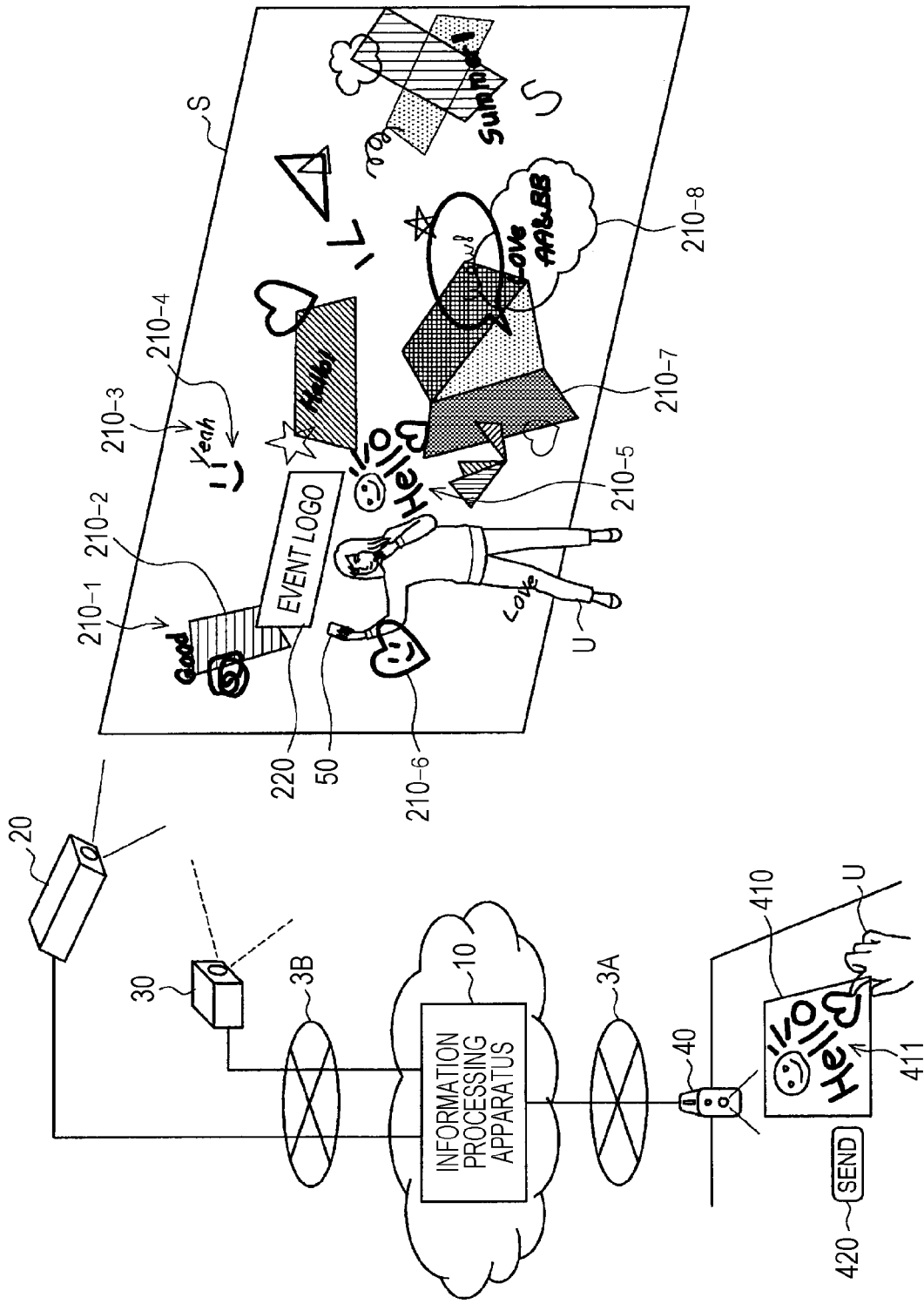
FIG. 1 is a diagram illustrating an overview of an information processing system according to an embodiment of the present disclosure.

Hereinafter, a preferred embodiment of the present disclosure will be described in detail with reference to the accompanying drawings. Note that in the present description and the drawings, the same reference numerals are assigned to components having substantially the same functional configurations to avoid duplicated explanations.

Furthermore, the description will be made in the following order.

1. Overview of information processing system according to embodiment of the present disclosure 2. Configuration of information processing apparatus 10
3. Operation process
3-1. Drawn image sending process
3-2. Drawn image presentation process
4. Modifications
4-1. Selection of objects to shoot
4-2. Display with face image of person who has drawn
4-3. Copying of drawn image
4-4. Calculation of popularity of drawn images
4-5. Display of specific logo in advance on handwriting input screen
4-6. Setting of photo area
4-7. Recognition of user position using platform with sensor
4-8. Arrangement of drawn images according to drawing locations
4-9. Setting up of optimum shooting area
4-10. Use of transparent display
4-11. Others
5. Summary

1. OVERVIEW OF INFORMATION PROCESSING SYSTEM ACCORDING TO EMBODIMENT OF THE PRESENT DISCLOSURE

FIG. 1 is a diagram illustrating an overview of an information processing system according to an embodiment of the present disclosure. As shown in FIG. 1, the information processing system according to the present embodiment includes a projector 20 that projects images on a wall surface as a projection area S, a camera 30 that images an area including the projection area S (the angle of view of the camera 30 (a recognition area) is the same as the projection area S or an area slightly larger than the projection area S), an information processing apparatus 10 that controls the projection of images by the projector 20, and a smart projector 40 that acquires input images handwritten by users on the wall surface or a table surface.

The projector 20, the camera 30, and the smart projector 40 are connected to the information processing apparatus 10 via networks 3 (3A and 3B) to be able to transmit and receive data. Furthermore, the projector 20, the camera 30, and the smart projector 40 are communicably connected to the networks 3 via, for example, a wired/wireless local-area network (LAN), Wireless Fidelity (Wi-Fi, registered trademark), Bluetooth (registered trademark), or the like.

The projector 20 is a projection device that projects images on a desired place in space. The projector 20 may be, for example, a fixed wide-angle projector or a so-called moving projector of a pan/tilt drive type or the like having a movable portion capable of changing the projection direction. A projection surface is not limited to a flat surface, and may be a curved surface or may be divided into two or more surfaces. Furthermore, a plurality of projectors 20 may be provided.

The camera 30 images the projection area S including a user located near the projection area S, acquires a captured image used for recognizing the user position, and outputs it to the information processing apparatus 10. The camera 30 may be, for example, implemented by an RGB camera. Furthermore, the camera 30 is provided substantially at the front of the projection area S, and can recognize the area (outline) of a user located in front of the projection area S, on the projection area S. Furthermore, a plurality of cameras 30 may be provided.

As shown in FIG. 1, the smart projector 40 is an interactive portable ultra-short throw projector that can project an image on a table surface, detect a touch operation on a projection surface with a sensor (a camera, a depth sensor, or the like), and display, for example, a path drawn by a user with an operating body such as a finger. For example, a user handwrites graffiti on a handwriting input screen 410 displayed on the table surface, and taps a "SEND" button 420. Consequently, a handwritten input object (image) 411 is sent to the information processing apparatus 10. In the example shown in FIG. 1, the smart projector 40 is placed on a table, the handwriting input screen 410 is projected on the table surface, and handwriting input is performed on the table surface. However, the present embodiment is not limited to this. For example, the smart projector 40 may be placed on the wall surface, a handwriting input screen may be projected on the wall surface, and handwriting input may be performed on the wall surface.

The system may include a plurality of smart projectors 40. The plurality of smart projectors 40 may be installed in remote locations (not limited to the same space as that of the projection area S). Furthermore, as an example here, a handwritten object is acquired using the smart projector 40, but the present embodiment is not limited to this. For example, a handwritten object may be acquired by a touch operation input performed on a touch panel display of a smartphone, a tablet terminal, or the like. Further, for example, a handwritten object may be acquired by a scanner. Moreover, the system is not limited to a handwritten object, and may acquire, as an object, an image created by a user using a PC or the like, a captured image (a still image or moving images) captured by a camera, or the like.

The information processing apparatus 10 is connected to the smart projector 40 via the network 3A to be able to transmit and receive data. Further, the information processing apparatus 10 is connected to the projector 20 and the camera 30 via the network 3B to be able to transmit and receive data. The information processing apparatus 10 may be in the same space as the smart projector 40 or the projector 20 and the camera 30, or may be a server on the cloud. In the present embodiment, a case where the information processing apparatus 10 is a server on the cloud will be described as an example.

The information processing apparatus 10 performs control to project with the projector 20 an object received from the smart projector 40 onto the projection area S. The information processing apparatus 10 performs control to generate, for example, an image in which a large number of objects are randomly arranged, and project it onto the projection area S. Objects 210 (210-1 to 210-8) drawn by many users are randomly displayed on the projection area S (the graffiti object 411 drawn by the user can also be sent from the smart projector 40 to the information processing apparatus 10 and projected as an object 210e), providing the enjoyment of seeing a lot of graffiti. The information processing apparatus 10 may display graffiti objects in an overlapping manner.

BACKGROUND

Here, it is also imagined that a user will not only enjoy seeing a lot of graffiti projected on the projection area S, but also, for example, enjoy taking a picture with graffiti that the user has drawn, graffiti that the user likes, or a lot of graffiti randomly displayed on the projection area S.

In this case, depending on the user's position, the arrangement of individual objects included in an image projected (presented) on the projection area S (presentation screen) may be undesirable. Specifically, a system configuration in which an image is projected onto the projection area S by the projector 20 causes the image to be projected onto the face of a user if the user is located between the projection area S and the projector 20. For example, when the user is going to take a selfie on a smartphone 50, the projected image gets in the way, preventing the user's face from being imaged clearly, or things like that occur.

Therefore, the information processing system according to the present disclosure recognizes the position of a user located near the presentation screen, and when detecting that the user is going to shoot, automatically changes the arrangement of objects to present so that the objects do not overlap the user's recognition area, thereby allowing picture taking in more desirable conditions.

Specifically, for example, the information processing apparatus 10 recognizes the position of a user located near the projection area S on the basis of a captured image acquired by the camera 30 that images the projection area S and the user, and performs arrangement control such that objects do not overlap a user recognition area. More specifically, the information processing apparatus 10 moves graffiti objects already presented on the user's recognition area away from the user. In this case, the graffiti objects appear to be pushed out by the user located in front of the projection area S. Consequently, no objects are projected on the user's face in an overlapping manner, and a clear picture can be taken.

Furthermore, in some cases, it is desirable (required) to also include a specific object, for example, an object showing the logo of a company that provides the system or an event in the angle of view at the time of shooting. Upon recognizing the user's position, the information processing apparatus 10 may perform control to present an event logo object 220 near the user.

The above has described the overview of the information processing system according to the embodiment of the present disclosure. Note that an object presented on the projection area S is not limited to an image scribbled by a user, and may be an image prepared in advance on the system side, and is not limited to a still image and may be moving images, and may be an image captured by a camera.

2. CONFIGURATION OF INFORMATION PROCESSING APPARATUS 10

Figure 2:
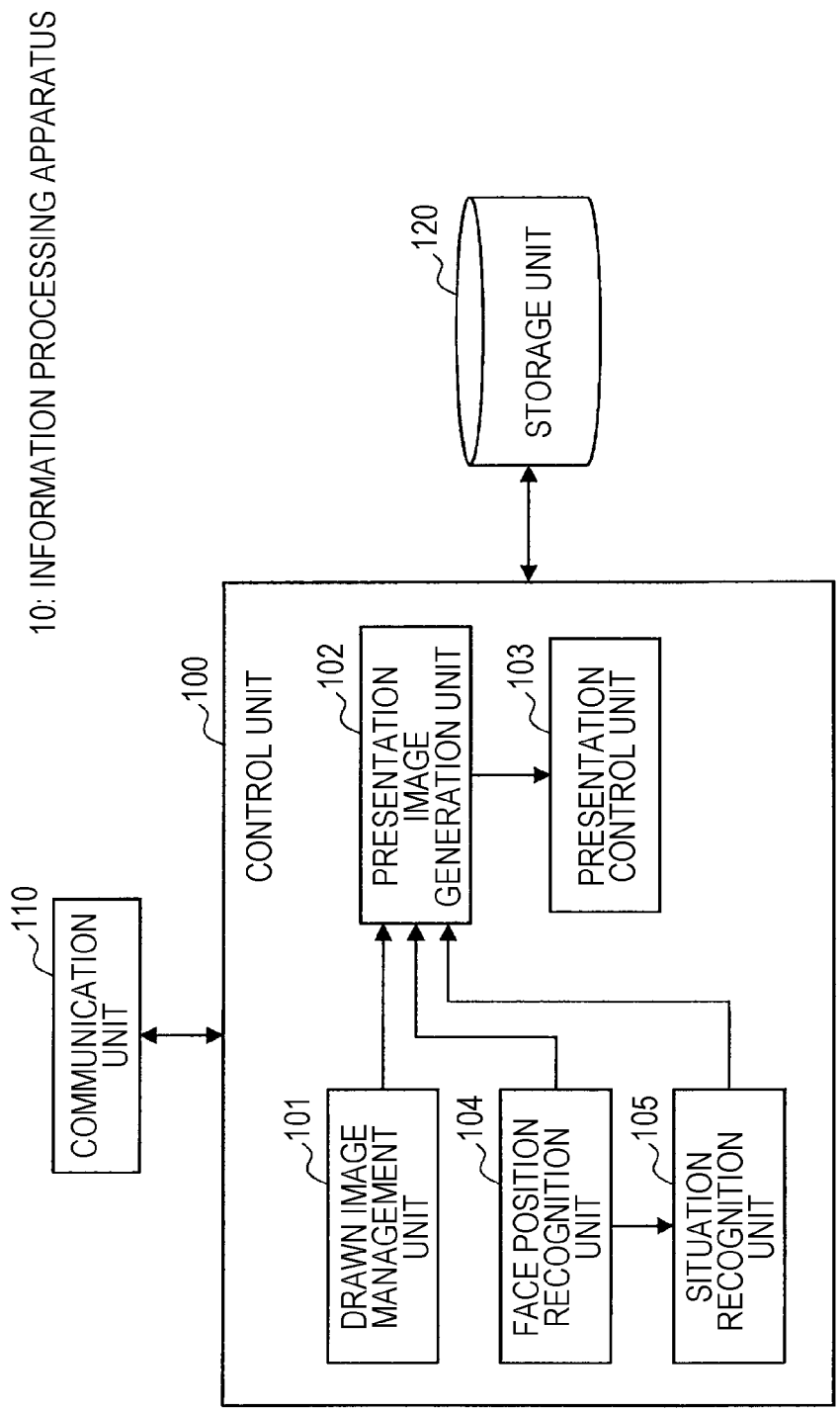
FIG. 2 is a block diagram showing an example of a configuration of an information processing apparatus according to the present embodiment.

FIG. 2 is a block diagram showing an example of a configuration of the information processing apparatus 10 according to the present embodiment. As shown in FIG. 2, the information processing apparatus 10 includes a control unit 100, a communication unit 110, and a storage unit 120.

The control unit 100 functions as an arithmetic processing unit and a controller, and controls all operations in the information processing apparatus 10 according to various programs. The control unit 100 is implemented by, for example, an electronic circuit such as a central processing unit (CPU) or a microprocessor. Furthermore, the control unit 100 may include read-only memory (ROM) that stores programs to be used, operation parameters, etc., and random-access memory (RAM) that temporarily stores parameters that are properly changed, etc.

Further, the control unit 100 according to the present embodiment functions as a drawn image management unit 101, a presentation image generation unit 102, a presentation control unit 103, a face position recognition unit 104, and a situation recognition unit 105.

The drawn image management unit 101 acquires an image drawn by a user (for example, the above-mentioned graffiti image, an example of an object) from the smart projector 40 or the like via the communication unit 110, and stores it in the storage unit 120. To the drawn image, attribute information such as information on the drawing time, information on the writing location, and information on the person who has written it (user information), and/or identification information for identifying the written image may be added.

The presentation image generation unit 102 generates a presentation image in which drawn images are arranged. At this time, the presentation image generation unit 102 may randomly arrange a large number of drawn images, or may arrange them according to their attribute information. The generated presentation image is transmitted by the presentation control unit 103 from the communication unit 110 to the projector 20, and is projected onto the projection area S.

Furthermore, the presentation image generation unit 102 may determine/change the arrangement of drawn images according to the result of face position recognition by the face position recognition unit 104 and the result of situation recognition by the situation recognition unit 105.

The face position recognition unit 104 recognizes the face position of a user located in front of the projection area S on the basis of a captured image captured by the camera 30. For example, the face position recognition unit 104 extracts the feature values of characteristic parts of the face such as the eyes, nose, and mouth from the captured image to detect the face. Face detection is not limited to a particular algorithm. In addition, the face position recognition unit 104 can further recognize the user's line of sight and face orientation on the basis of the captured image.

Furthermore, the face position recognition unit 104 may estimate the head position by bone estimation or the like based on the captured image and regard it as the face position, or extract an accessory on the head such as a hat or glasses on the basis of the captured image to recognize the face position. Furthermore, in a case where a head accessory provided with a given QR code (registered trademark), an IR light-emitting part, or the like is distributed at an event, and the user wears it on the head, the face position recognition unit 104 can detect the QR code or IR light by the camera 30 (such as an IR camera when detecting IR light) to recognize the user's face position. Moreover, the function of recognizing the position of the user's "face" has been described here as an example, but the present embodiment is not limited to this. The control unit 100 may have a function of recognizing the whole body of the user on the basis of an image captured by the camera 30.

The situation recognition unit 105 recognizes the surrounding situation on the basis of an image captured by the camera 30. Specifically, the situation recognition unit 105 detects the user's shooting preparation movement on the basis of the captured image. The detection of the user's shooting preparation movement is the detection of shooting to be performed with the user as a subject. For example, it can be detected by image recognition that the user is going to take a selfie using a camera such as a smartphone, from the user's movement or the like. Furthermore, the situation recognition unit 105 may detect, as the shooting preparation movement, a case where the face orientation detected from the captured image is in the direction in which the projection area S faces (the front direction). Furthermore, the user is not limited to taking a selfie and may have his or her picture taken by another person. Thus, the situation recognition unit

105 may recognize another user holding a camera toward the user from a captured image, and detect it as the shooting preparation movement.

When the user's shooting preparation movement is detected, the presentation image generation unit 102 changes and determines the arrangement of objects to be presented on the projection area S to avoid overlapping with the user's face area. Consequently, when the user takes a picture in front of the projection area S, a clean picture can be taken without images projected onto the projection area S overlapping the user's face. Note that since objects are withdrawn from the user's face area, transparent light is projected on the user's face. However, there is no problem in illuminating the user's face brightly in terms of shooting, which may rather be effective. Alternatively, it is possible not to perform projection itself on the user's face area.

As described above, the determination of the user's face area on the presentation image results in an area corresponding to the user's face position recognized on the basis of the captured image of the projection area S captured by the camera 30. It is desirable that the camera 30 images the projection area S from, for example, substantially the front of the projection area S, but the present embodiment is not limited to this. For example, the face position recognition unit 104 may recognize an area shadowed by the user on the projection area S as the user area (including the face area) on the basis of an image captured by the camera 30.

(Communication Unit 110)

The communication unit 110 is connected to the networks 3 (3A and 3B) by wire or radio, and transmits and receives data to and from external devices via the networks 3. The communication unit 110 is communicably connected to the networks 3 via, for example, a wired/wireless local-area network (LAN), Wireless Fidelity (Wi-Fi, registered trademark), Bluetooth (registered trademark), or the like.

(Storage Unit 120)

The storage unit 120 is implemented by read-only memory (ROM) that stores programs, operation parameters, etc. used in the processing of the control unit 100, and random-access memory (RAM) that temporarily stores parameters that are changed properly, etc.

For example, the storage unit 120 stores drawn images (objects) managed by the drawn image management unit 101 and an object (image) showing a title logo prepared in advance.

The above has specifically described the configuration of the information processing apparatus 10 according to the present embodiment. Note that the configuration of the information processing apparatus 10 shown in FIG. 2 is an example, and the present embodiment is not limited to this.

For example, the information processing apparatus 10 may include a plurality of apparatuses, or at least a part of the configuration may be located in an external device (for example, a client terminal, an edge server, the projector 20, the camera 30, the smart projector 40, or the like in a case where the information processing apparatus 10 is a server).

3. OPERATION PROCESS

<3-1. Drawn Image Sending Process>

Figure 3:
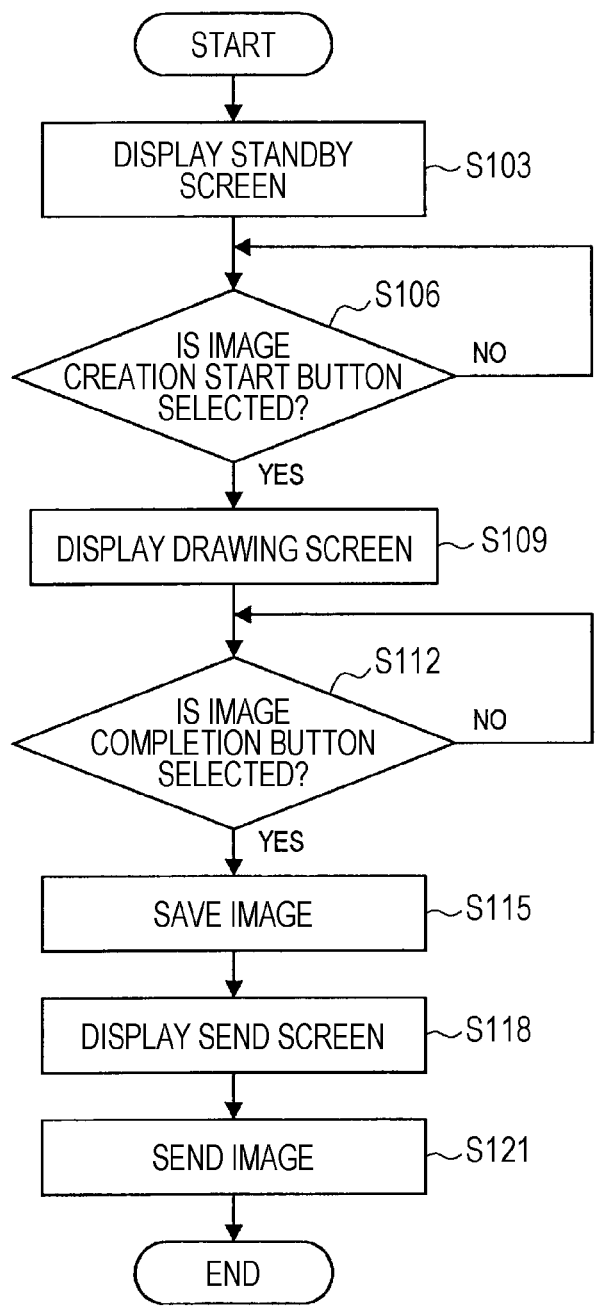
FIG. 3 is a flowchart showing an example of a flow of a drawn image sending process according to the present embodiment.

FIG. 3 is a flowchart showing an example of a flow of a drawn image sending process according to the present embodiment.

As shown in FIG. 3, first, the smart projector 40 displays a standby screen (step S103). When an image creation start button is selected (step S106/Yes), it displays (projects on the table surface) a drawing screen (step S109). A drawing operation may be performed by a touch operation (by handwriting) on a projected screen displayed on the table surface.

Then, when an image completion button is selected (step S112/Yes), the image is saved (step S115), and a send screen is displayed (step S118). On the send screen, for example, a display such as "Are you sure you want to send this?" is presented. The user taps the "SEND" button 420 projected on the table surface as shown in FIG. 1. In a case where there are multiple projection areas S or the like, a send location (image output location) may be selected on the send screen.

Then, the smart projector 40 transmits the image to the information processing apparatus 10 (step S121). After the transmission, the smart projector 40 may display a guide screen indicating the completion of the transmission and the destination of the transmission (the location of the projection area S).

The above has described the drawn image sending process according to the present embodiment. Note that the smart projector 40 is used here as an example, but the present embodiment is not limited to this. For example, a written image may be generated and sent using a touch panel display.

<3-2. Drawn Image Presentation Process>

Figure 4:
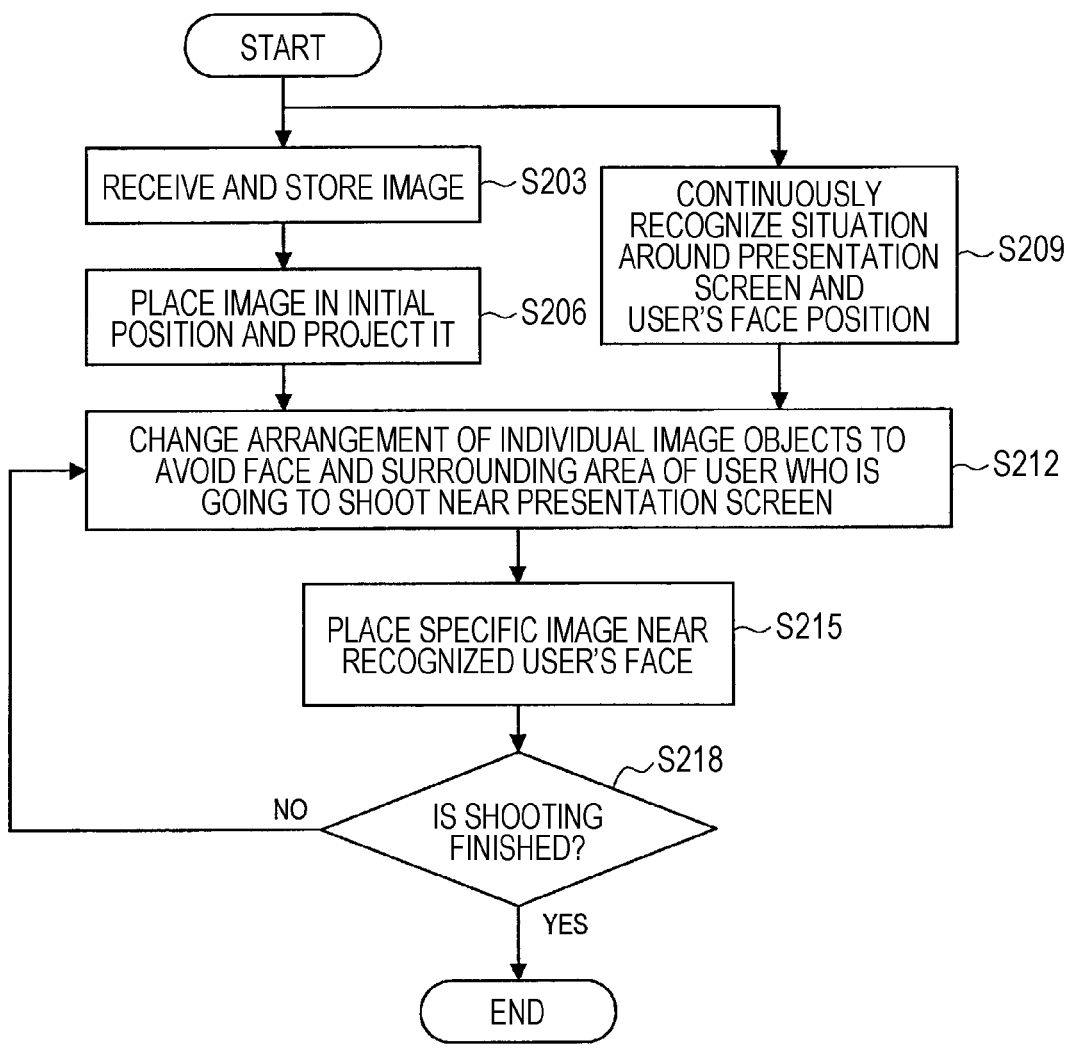
FIG. 4 is a flowchart showing an example of a flow of a drawn image presentation process according to the present embodiment.

Next, a drawn image presentation process will be described with reference to FIG. 4. FIG. 4 is a flowchart showing an example of a flow of a drawn image presentation process according to the present embodiment.

As shown in FIG. 4, first, the information processing apparatus 10 receives an image from the smart projector 40, and stores it in the storage unit 120 (step S203).

Next, the information processing apparatus 10 places the received image in an initial position and projects it from the projector 20 (step S206). The initial position is, for example, a randomly determined position in a case of random display, or a position at the left side of the projection area S in a case where there is a rule that newer drawings be displayed further to the left. Furthermore, the information processing apparatus 10 may set in advance an upper limit to the number of drawn images to be presented on the projection area S, and delete images in the time order in which they were written if the upper limit is exceeded. Moreover, a threshold value of a presentation time of a drawn image to be presented may be set in advance, and the drawn image may be deleted when the threshold value of the presentation time is exceeded.

On the other hand, the information processing apparatus 10 continuously recognizes the situation around the presentation screen and the face position of the user located near the projection area S on the basis of captured images captured by the camera 30 (step S209).

Next, according to the user's face position recognition result and the situation recognition result, the information processing apparatus 10 performs control to change the arrangement of individual images (objects) to avoid the face and the surrounding area of the user who is going to shoot near the presentation screen (step S212). The change of object arrangement will be described with reference to FIG. 5.

Figure 5:
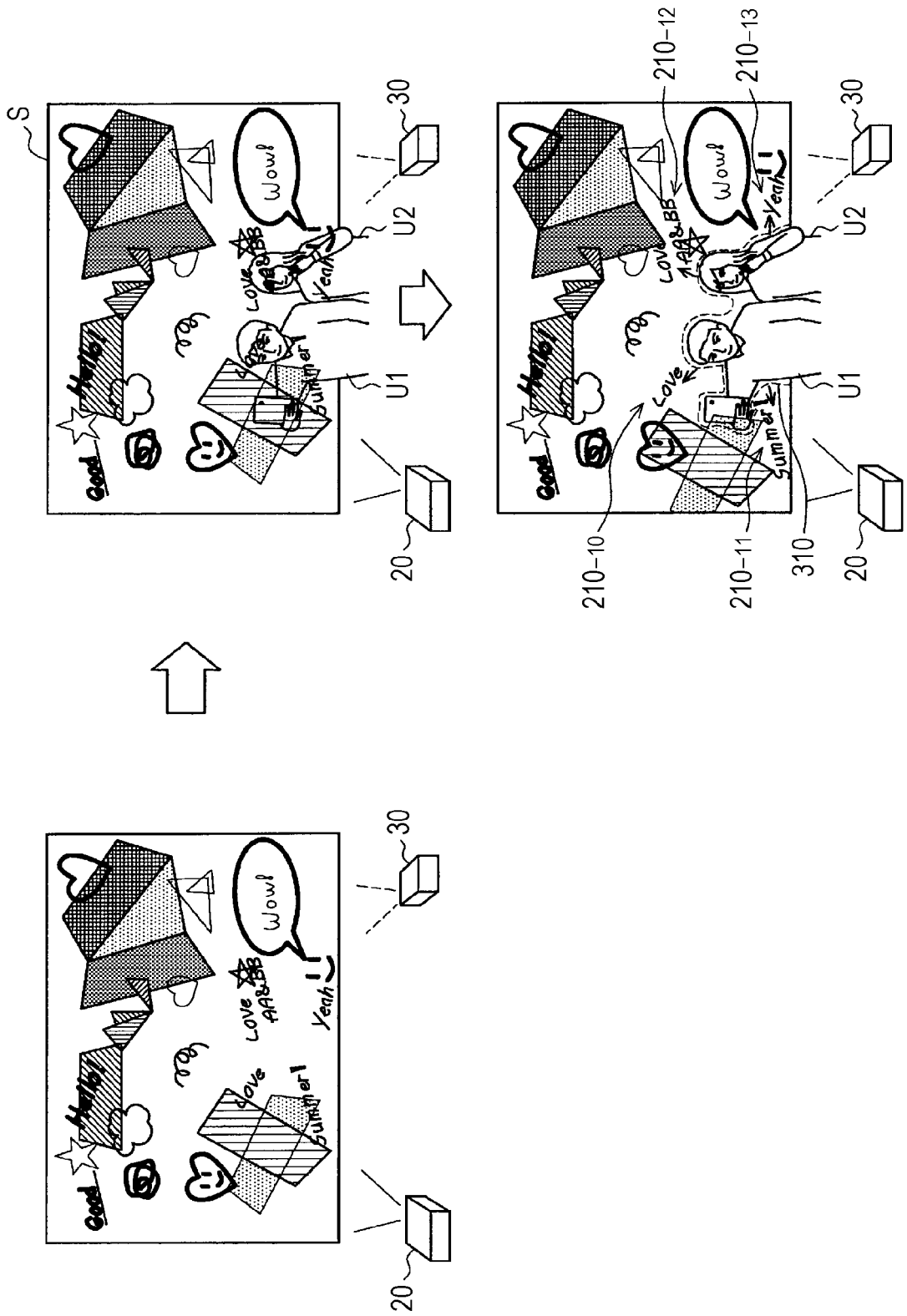
FIG. 5 is a diagram illustrating a change in the arrangement of objects in accordance with users' face positions according to the present embodiment.

FIG. 5 is a diagram illustrating the change of object arrangement in accordance with a user's face position according to the present embodiment. In a case where a large number of drawn images (objects) are projected on the projection area S by the projector 20 as shown in an upper left diagram of FIG. 5, when users U1 and U2 stand in front of the projection area S and hold a camera to take a selfie as shown in an upper right diagram of FIG. 5, the selfie taking movement is detected on the basis of an image captured by the camera 30 (at least the orientation of their faces being in the front direction is detected).

In this case, as shown in a lower right diagram of FIG. 5, the information processing apparatus 10 determines a user recognition area 310 including at least the users' faces on the basis of the image captured by the camera 30, and, to avoid the recognition area 310, moves surrounding objects 210-10 to 210-13 (their presentation positions) away from the recognition area 310 (so that they do not overlap the recognition area 310). Consequently, no objects overlap the users' faces at the time of shooting, and a clear shot can be taken. It is imagined that a user who wants to take a picture with an image drawn by the user will move himself or herself closer the written image and perform selfie taking or the like. At this time, another drawn image may be projected on the user's face. In the present embodiment, control is performed to move objects overlapping a user's face like this away from the user. In an animation in which objects are moved, the user appears to be pushing drawn images out of the user area (the drawn images appear to be avoiding the user). Note that in the diagram shown in the lower right of FIG. 5, the presentation can also be controlled so as not to overlap portions other than the faces, but the present embodiment is not limited to this. The presentation may be controlled so that no objects overlap only a face recognition area corresponding to a face position.

Figure 6:
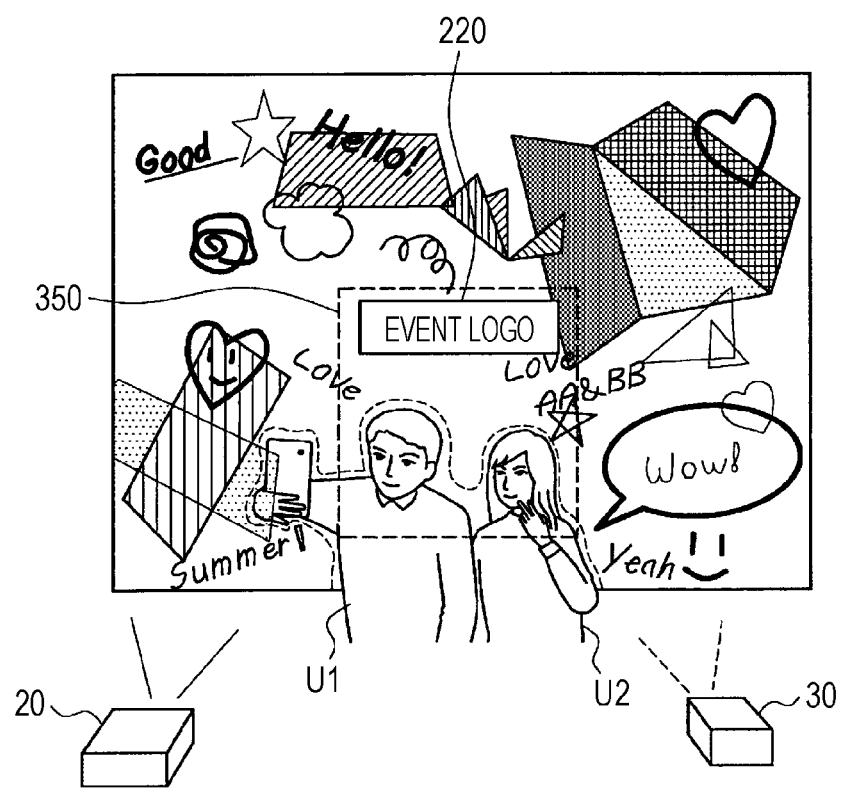
FIG. 6 is a diagram illustrating the arrangement of an event logo object according to the present embodiment.

Furthermore, the information processing apparatus 10 may control to place a specific image near the recognized user's face (step S215). The specific image is, for example, a high-priority object, and more specifically, may be an object generated in advance which shows an event logo or a company logo (advertising object), an object specified by the user, an object of high popularity, or the like. Furthermore, the information processing apparatus 10 may control the presentation so that images (objects) other than the specific image move away from the user's area. Here, FIG. 6 shows a diagram illustrating the placement of the event logo object 220. For example, when the information processing apparatus 10 recognizes users who are going to shoot as shown in FIG. 6, it displays the event logo object 220 near the users' faces. Further, the information processing apparatus 10 may change the size of the event logo object 220 according to the size of the users' faces. Furthermore, the information processing apparatus 10 may adjust the placement and size of the event logo object 220, estimating the angle of view of a camera with which the users shoot. Specifically, for example, a square angle of view 350 in which the users' faces occupy at least one third the area may be estimated, and the event logo object 220 may be adjusted in size and placement so that portions where the event logo object 220 and a drawn image are shown also occupy one third the area each. Furthermore, in a case where the distance between a camera to shoot a user (for example, a camera held by the user) and the user or the projection area S (focal length) can be measured by the camera 30 or another sensor device installed, the information processing apparatus 10 may adjust the size and placement of the event logo object 220 according to the distance (estimating the angle of view). The distance between a camera (for example, a camera held by a user) and the user or the projection area S (focal length) may be detected by the camera and acquired.

Furthermore, if a recognized user moves in front of the projection area S (for example, it is imagined that the user moves his or her position, facing the front while checking his or her image on a camera with which to take a selfie), the information processing apparatus 10 may follow the user and cause the specific image to follow the user.

Note that in a case where the projection area S is a large screen, a situation where many users perform selfie taking or the like individually at the same time is imagined. In this case, if the information processing apparatus 10 can recognize multiple user groups, it may control to present one event logo object 220 to each group. The following gives a description with reference to FIG. 7.

FIG. 7 is a diagram illustrating the presentation of event logo objects in a case where multiple user groups are recognized according to the present embodiment. As shown in an upper diagram of FIG. 7, if the face positions of multiple users U1 to U3 are recognized from an image captured by the camera 30, the information processing apparatus 10 can determine whether or not they are in the same group according to the respective distances between the face positions. For example, if a distance d between users is 50 cm or less, it may be determined that they are in the same group, and if the distance between users exceeds 50 cm, it may be determined that they are in different groups. The numerical values are an example, and the present embodiment is not limited to this.

If it is determined that the user U1 and the user U2 are in the same group on the basis of the distance between the users, the information processing apparatus 10 presents an event logo object 220-1 as shown in the upper diagram of FIG. 7. In addition, an event logo object 220-2 is presented near the user U3 who has been determined to be in a different group. This prevents a scramble for the event logo object 220, and each group can take a picture with the event logo object 220.

Note that also in this case, if the user U3 moves, for example, the information processing apparatus 10 moves the presentation position so that the event logo object 220-2 follows the user U3.

Furthermore, if the user U3 leaves the projection area S, the information processing apparatus 10 may hide the event logo object 220-2, and if another user is going to take a picture in front of the projection area S, it may display the even logo object 220-2.

The above has described the operation process according to the present embodiment. Note that the information processing apparatus 10 may perform white projection (transparent light irradiation) on a recognized user area so that the user area and the surrounding area become bright.

4. MODIFICATIONS

Next, modifications of the present embodiment will be described.

<4-1. Selection of Objects to Shoot>

A user can select an object to shoot from a large number of objects presented on the projection area S. The information processing apparatus 10 can bring the selected object closer to the user's face or display it temporarily in a larger size to facilitate shooting.

FIG. 8 is a diagram illustrating the selection of objects to shoot according to a first modification of the present embodiment. When a user selects objects 210-20 and 210-21 by, for example, a stick with a marker or pointing as shown in an upper part of FIG. 8, and performs a shooting preparation movement with them selected as shown in a lower part of FIG. 8, the information processing apparatus 10 performs control to bring the selected objects 210-20 and 210-21 closer to the user or display them in a larger size. At the time of selection by the user, animation such as shaking the object may be added as feedback.

The stick with the marker is, for example, an indicator with a QR code (registered trademark) attached to the tip of a stick. The marker is detected from an image captured by the camera 30 to recognize the position pointed by the user. Here, the case of using the stick with the marker has been described as an example, but the present embodiment is not limited to this. A stick provided with an IR light-emitting part may be used, or a gesture such as pointing may be used for indication.

<4-2. Display with Face Image of Person Who has Drawn>

The system can also acquire the face of a user drawing by the smart projector 40 and present it on the projection area S together with a drawn image (object). The following gives a description with reference to FIG. 9.

Figure 9:
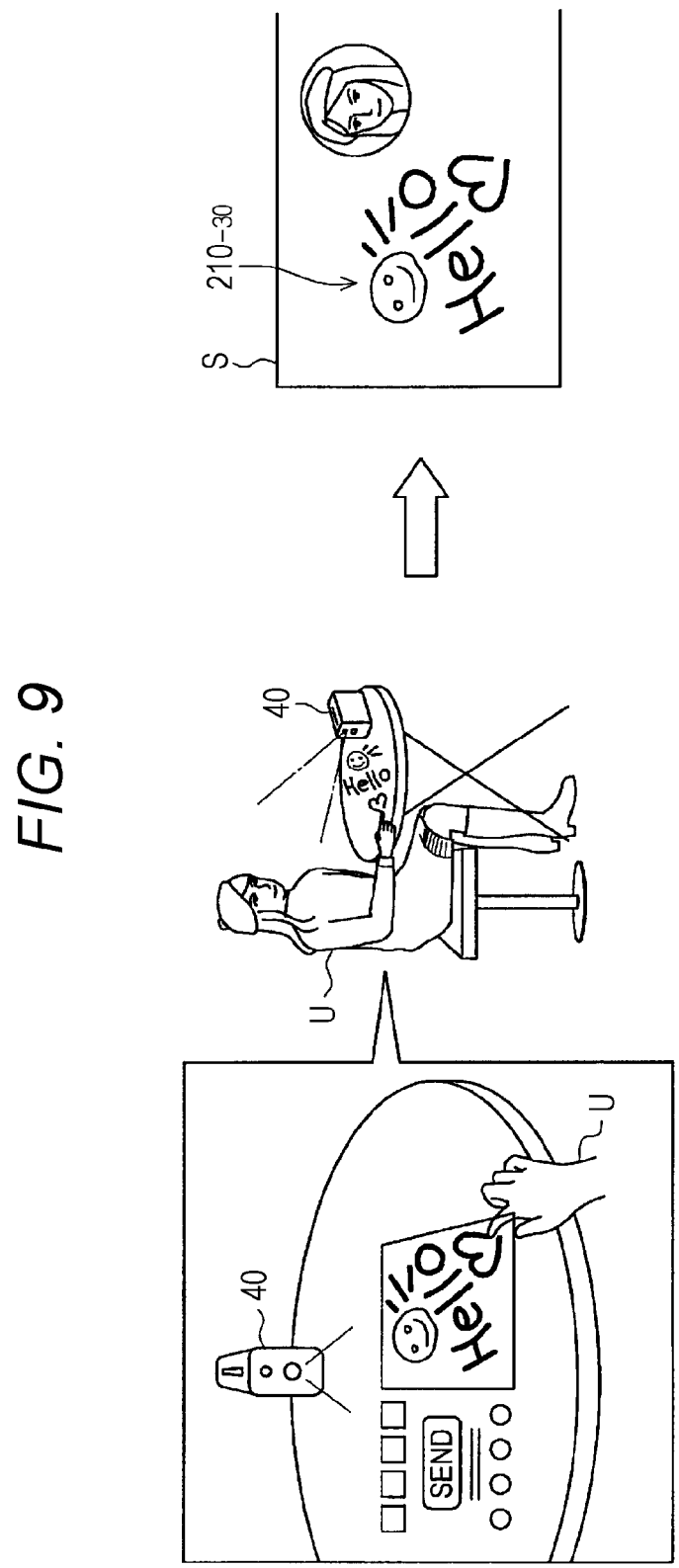
FIG. 9 is a diagram illustrating the imaging and display of a user drawing according to a second modification of the present embodiment.

FIG. 9 is a diagram illustrating the imaging and display of a user drawing according to a second modification of the present embodiment. As shown in FIG. 9, the user drawing on the drawing screen projected onto the table surface (a face image) may be captured by the smart projector 40, and a captured image (a still image or moving images) may be presented on the projection area S together with a drawn image (object 210-30). This makes it possible to intuitively determine what type of person has drawn it, a drawing by a celebrity, or the like. Further, the information processing apparatus 10 may set an identification flag for an image drawn by a celebrity and store it. Furthermore, if there is a celebrity identification flag, the information processing apparatus 10 may display a given official artist image instead of a user image captured during drawing, the drawn image.

<4-3. Copying of Drawn Image>

If a drawn image created by a person identified as a celebrity (with a celebrity identification flag) is selected by the stick with the marker or the like as described above with reference to FIG. 8, the information processing apparatus 10 may create a copy of the drawn image and move the created copy closer to the user. This is because an image drawn by a celebrity is assumed to be very popular. This allows multiple users to simultaneously shoot with an image drawn by a celebrity, individually.

<4-4. Calculation of Popularity of Drawn Images>

The information processing apparatus 10 may also calculate the popularity of each drawn image presented on the projection area S, and perform presentation control according to the degree of popularity.

For example, the information processing apparatus 10 is enabled to project each drawn image on the projection area S with a marker such as an IR marker invisible to the naked eye attached thereto, and recognize the presentation position of each drawn image and a user's position by the camera 30. Next, the information processing apparatus 10 can calculate the popularity of each drawn image according to the number of times it has been selected by the stick with the marker or the like as described above with reference to FIG. 8, the number of people gathered, watching (turning their faces toward) the drawn image, the number of users who have shot in front of the drawn image, or the like.

Then, the information processing apparatus 10 may control to display a drawn image having a popularity higher than a predetermined value in a larger size, or continue to display it without erasing it even when a presentation time threshold value set in advance is exceeded (increase the presentation time threshold value), or leave a drawn image having a popularity higher than the predetermined value even in a case where images are deleted in the time order in which they were written.

Furthermore, in a case where a drawn image having a popularity higher than the predetermined value is selected by the stick with the marker or the like as described above with reference to FIG. 8, a copy of the drawn image may be created, and the created copy may be moved closer to the user. Moreover, the event logo object 220 (advertising logo) may be displayed near a drawn image having a popularity higher than the predetermined value.

<4-5. Display of Specific Logo in Advance on Handwriting Input Screen 410>

Furthermore, the projection area S may be used as a message board for a player just before his or her appearance before a sports game, or as a message board for an artist just before his or her appearance at a live festival. In this case, the information processing apparatus 10 collects messages for a player or an artist to appear from the smart projector 40.

Figure 10:
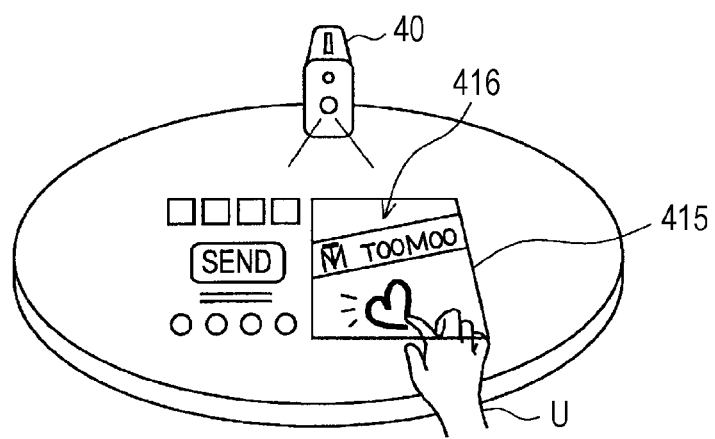
FIG. 10 is a diagram showing an example of a handwriting input screen on which a specific logo is displayed in advance according to a fifth modification of the present embodiment.

In this case, the smart projector 40 may display in advance an official logo, face image, or the like corresponding to a player, a team, or an artist to appear on a handwriting input screen. A handwriting input screen including such a logo can be acquired from the information processing apparatus 10. FIG. 10 shows an example of a handwriting input screen on which a specific logo is displayed in advance according to the present modification. As shown in FIG. 10, the smart projector 40 projects a handwriting input screen 415 on which a specific logo image 416 is displayed in advance on a table surface or the like, and detects a drawing operation by a user. Since the specific logo image 416 is displayed in advance, the user can easily draw a support message or the like.

<4-6. Setting of Photo Area>

In a case where the projection area S is a large screen, the system may divide it into a photo area where an image drawn and sent by a user is displayed immediately and can be shot, and an area where drawn images after shooting are pooled, to perform presentation control. The following gives a description with reference to FIG. 11.

Figure 11:
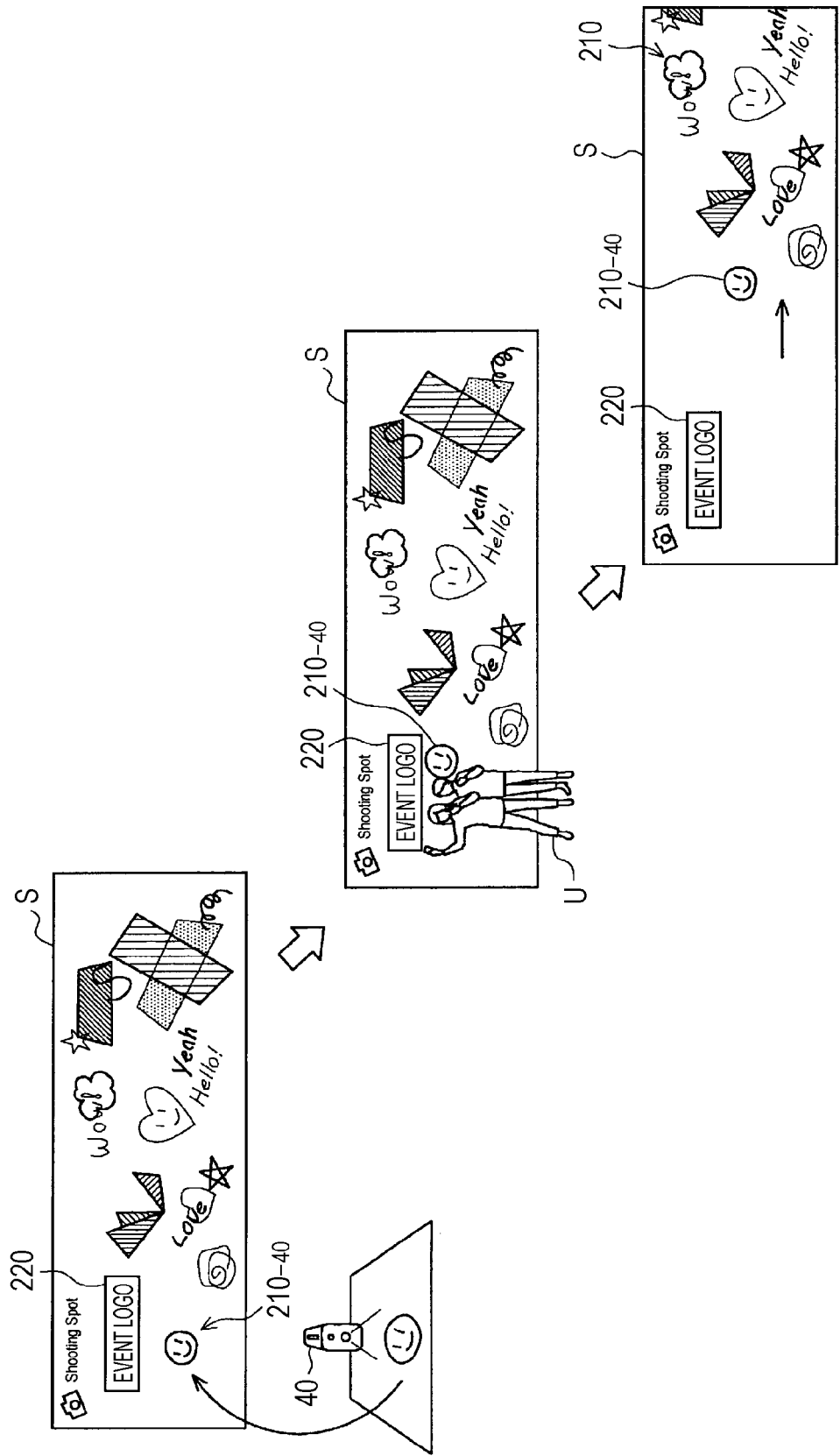
FIG. 11 is a diagram illustrating the setting of a photo area on a projection area S according to a sixth modification of the present embodiment.

FIG. 11 is a diagram illustrating the setting of the photo area on the projection area S according to the present modification. As shown in an upper part of FIG. 11, for example, the information processing apparatus 10 sets a predetermined area of the projection area S as a photo area, on which it displays the event logo object 220 and displays a drawn image (object 210-40) acquired from the smart projector 40 in real time.

As shown in a middle part of FIG. 11, this allows the user to shoot including the drawn image (object 210-40) drawn by himself or herself and the event logo object 220 without being obstructed by surrounding drawn images. At this time also, the information processing apparatus 10 may recognize the users' face positions and control the placement so that the drawn image (object 210-40) does not overlap the face area.

Next, when the shooting has been finished (for example, when a predetermined time has elapsed), as shown in a lower part of FIG. 11, the information processing apparatus 10 moves the drawn image (object 210-40) from the photo area and displays it on the area where a large number of past drawn images (objects 210) are pooled. The information processing apparatus 10 may control the display such that the drawn images (objects 210) flow in a predetermined direction with the lapse of time. Alternatively, the information processing apparatus 10 may randomly display the past drawn images (objects 210) on the area where they are pooled, and delete the drawn images in the order in which they were written if the number of them displayed exceeds a predetermined value.

<4-7. Recognition of User Position Using Platform with Sensor>

Although it has been described that a user's area recognition is performed on the basis of an image captured by the camera 30, the present embodiment is not limited to this. For example, a platform may be prepared in front of the projection area S, and a user's position may be recognized from the weight or the like to estimate the user's area. The following gives a description with reference to FIG. 12.

Figure 12:
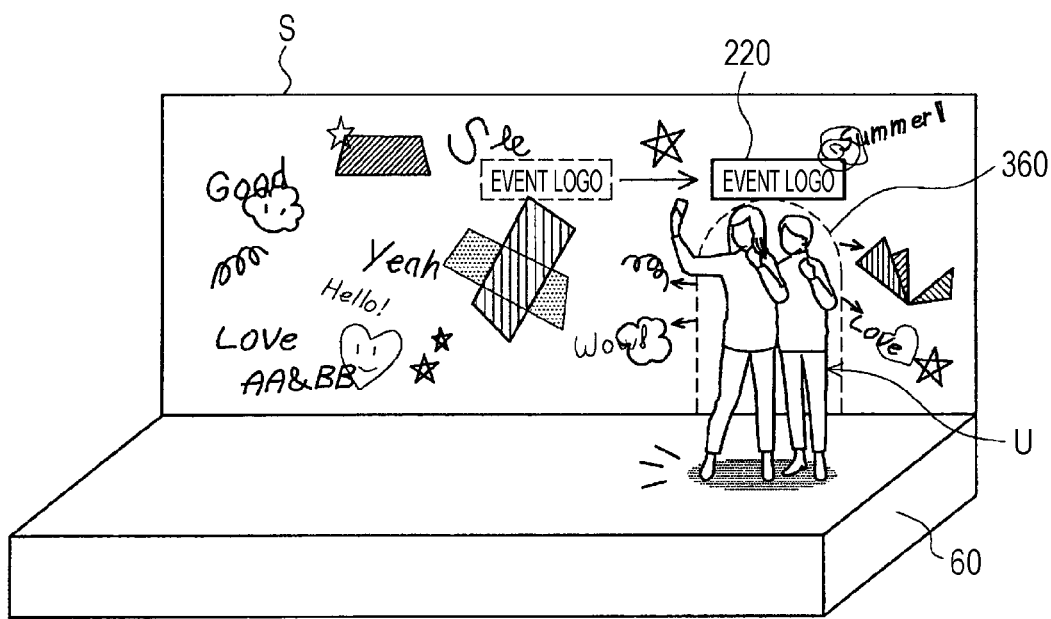
FIG. 12 is a diagram illustrating an example of user position recognition using a platform according to a seventh modification of the present embodiment.

FIG. 12 is a diagram illustrating an example of user position recognition using a platform 60 according to the present modification. As shown in FIG. 12, for example, the platform 60 is prepared in front of the projection area S. When users get on it, the users' positions are determined from their weights or the like, and a user area 360 on the projection area S is estimated based on their positions. The information processing apparatus 10 can control the arrangement of drawn images to avoid the estimated user area 360, and control to bring the event logo object 220 closer. This allows the recognition of a user position without installing the camera 30.

Note that the size and height of the user area 360 may be set in advance to approximate values, or may be changed according to weight.

<4-8. Arrangement of Drawn Images According to Drawing Locations>

In a case where a large number of smart projectors 40 are installed in remote locations, the system can also control the arrangement of drawn images according to the drawing locations. This allows an intuitive grasp of where images have been drawn for more enjoyment. The following gives a description with reference to FIG. 12.

Figure 13:
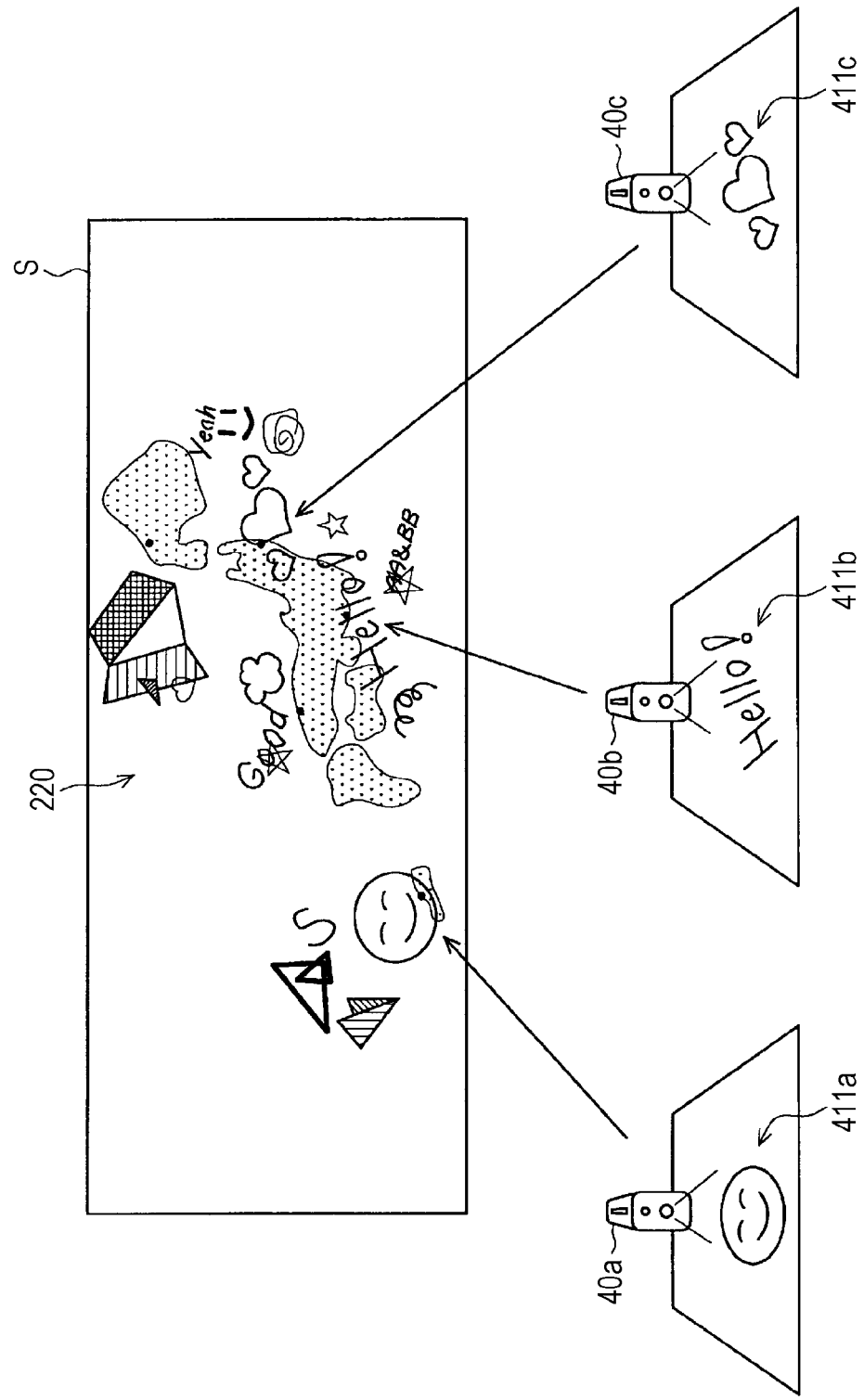
FIG. 13 is a diagram illustrating the arrangement of drawn images in accordance with drawing locations according to an eighth modification of the present embodiment.

FIG. 13 is a diagram illustrating the arrangement of drawn images in accordance with drawing locations according to the present modification. As shown in FIG. 13, for example, a map may be displayed on the projection area S, and drawn images 411*a* to 411*c* acquired from smart projectors 40*a* to 40*c*, respectively, may be displayed in positions corresponding to the respective locations where the smart projectors 40 are installed.

Furthermore, not limited to the arrangement of drawn images according to their drawing locations, drawn images may be differentiated in color (background color or frame color) according to their drawing locations.

<4-9. Setting up of optimum shooting area>

Figure 14:
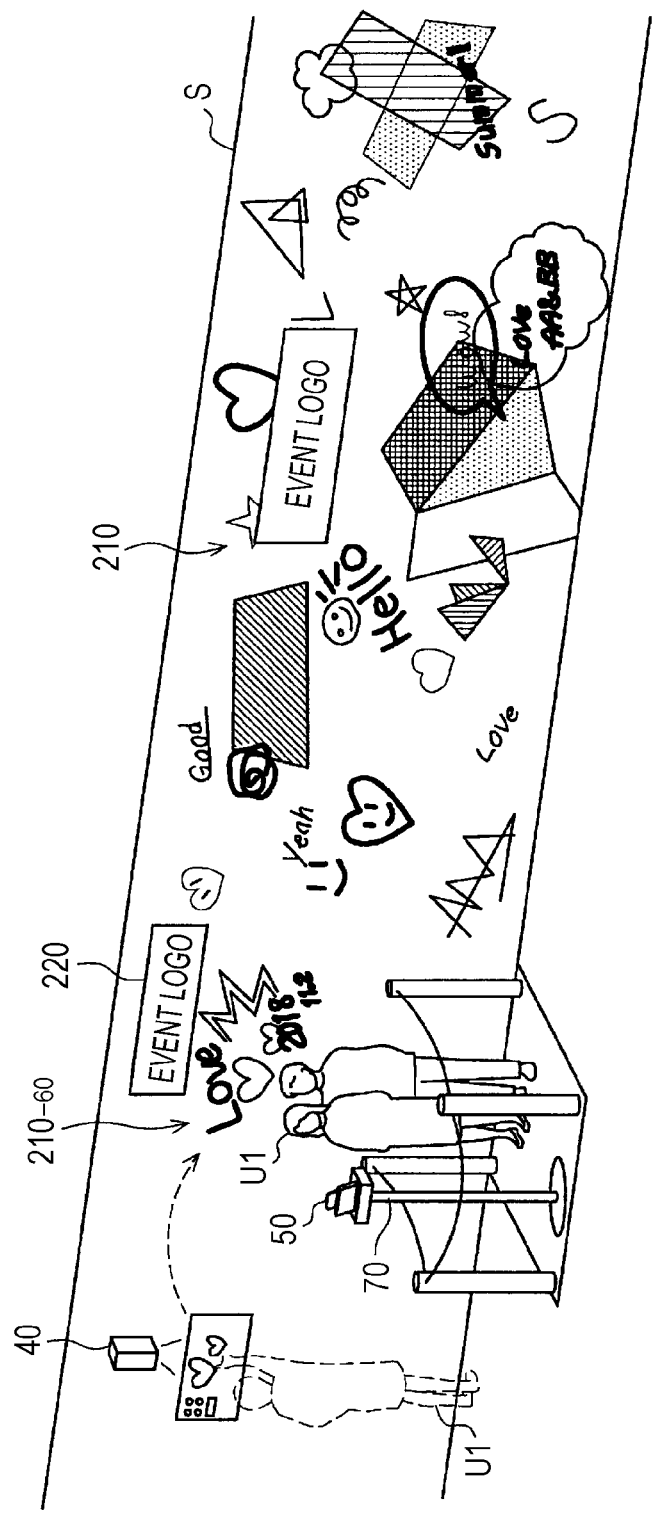
FIG. 14 is a diagram illustrating the setting up of an optimum shooting area according to a ninth modification of the present embodiment.

The system may set up an optimum shooting area in front of the projection area S. FIG. 14 is a diagram illustrating the setting up of an optimum shooting area according to the present modification.

As shown in FIG. 14, when a user U1 draws with the smart projector 40 installed on the wall surface and taps a "SEND" button, for example, a drawn image (object 210-60) is displayed on the wall surface of an optimum shooting area provided on the projection area S. The event logo object 220 is also displayed on the wall surface of the optimum shooting area.

For example, the optimum shooting area is surrounded with a fence or a booth so that only a person(s) to shoot can enter. Then, a camera such as a smartphone 50 of the user U1 is placed on a camera stand 70, and shooting is performed by, for example, timer shooting of the smartphone 50. When the shooting is finished (when a predetermined time has elapsed), the drawn image (object 210-60) is displayed, for example, randomly on an adjacent pool area.

Note that shooting is not limited to a user's own camera. For example, a dedicated camera may be installed on the camera stand 70, and shooting may be performed with the dedicated camera. In this case, the information processing apparatus 10 displays a given QR code or the like on the wall surface after shooting, and a user reads it with a smartphone. The user accesses a URL read from the QR code (or launches a given application) to acquire an image captured by the dedicated camera.

<4-10. Use of Transparent Display>

The system is not limited to the system configuration shown in FIG. 1. For example, an example as shown in FIG. 15 is also conceivable in which a transparent display is installed in front of a user to display objects.

Figure 15:
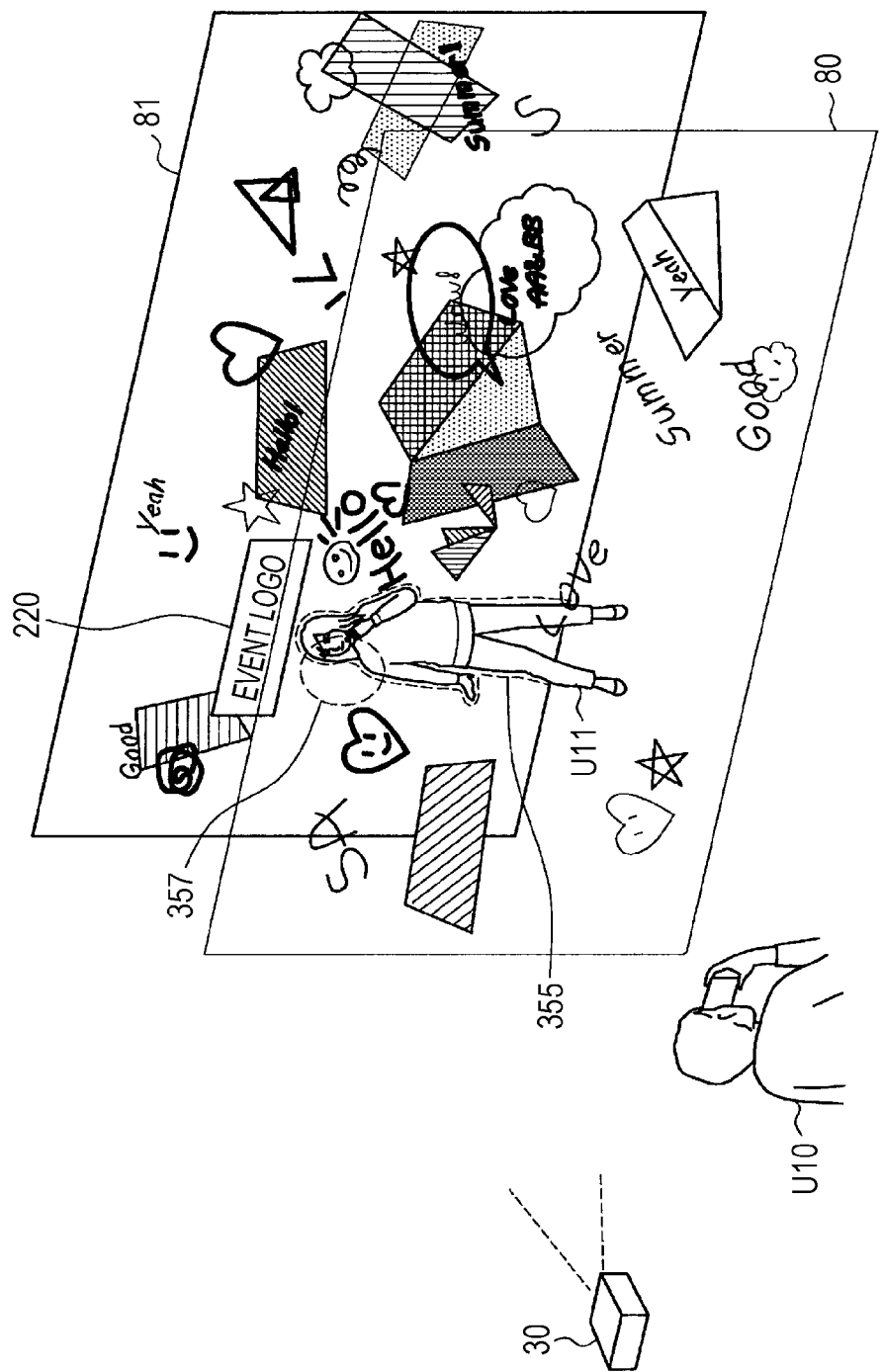
FIG. 15 is a diagram illustrating object arrangement control in a case where a transparent display is used according to a tenth modification of the present embodiment.

FIG. 15 is a diagram illustrating object arrangement control in a case where a transparent display is used according to the present modification.

As shown in FIG. 15, a case where displays are installed in front of and behind a user is conceived, for example. A rear display 81 installed behind the user may be a liquid crystal display device, or may be the projection area S by the projector 20 described above.

In addition, a transparent display 80 is located in front of the user, on which various objects are displayed, move, and/or flow.

A user U11 stands behind the transparent display 80 when a user U10 shoots. If objects displayed on the transparent display 80 overlap the face of the user U11, a problem that the user's face is not imaged clearly occurs. Therefore, as in the above-described embodiment, the system also controls to recognize the face position of the user U11 on the basis of a captured image acquired by the camera 30, and display objects, avoiding a face area 357 (or an area of the whole body of the user U11) corresponding to the face position. Further, also on the rear display 81, control may be performed likewise to recognize a user area 355 and display such that objects displayed on the rear display 81 avoid the user area 355.

<4-11. Others>

In a case where the smart projector 40 and the projection area S are in the same event venue, when a drawn image is sent from the smart projector 40 (to the information processing apparatus 10), control may be performed such that the drawn image moving from the smart projector 40 to the projection area S is actually displayed (projected) by a projector installed in the event venue and a display on the wall and/or the floor.

A tap operation or the like on a drawn image displayed on the projection area S may be detected by a sensor so that a given sticker image can be added.

Furthermore, a tap operation or the like on a drawn image displayed on the projection area S may be detected by a sensor, support for the drawn image may be counted, the count value may be displayed, the popularity may be calculated according to the count value, and/or the drawn image may be displayed in a larger size and/or displayed for a longer time according to the count value.

When drawing is performed with the smart projector 40, the finger pressure may be detected, and the shades of color of a line drawn may be expressed according to the finger pressure.

5. SUMMARY

Although the preferred embodiment of the present disclosure has been described in detail above with reference to the accompanying drawings, the present technology is not limited to the examples. It is obvious that a person having ordinary skill in the technical field of the present disclosure can arrive at various alterations or modifications within the scope of the technical ideas described in the claims. These are, of course, considered to belong to the technical scope of the present disclosure.

For example, it is possible to create a computer program for causing hardware such as a CPU, ROM, and RAM built in the above-described information processing apparatus 10 to deliver the functions of the information processing apparatus 10. Furthermore, a computer-readable storage medium in which the computer program is stored can be provided.

Moreover, the effects described in the present description are merely illustrative or exemplary and are not limiting. That is, the technology according to the present disclosure can achieve other effects that are obvious to those skilled in the art from the description of the present description in addition to the above effects or in place of the above effects.

Note that the present technology can also have the following configurations.

(1)

An information processing apparatus including a control unit that performs control according to a result of recognition of a user located near a presentation screen on which an object is presented, and a result of detection of a shooting preparation movement of the user, to present a given object such that the given object does not overlap a recognition area of the user.

(2)

The information processing apparatus according to (1) above, in which the control unit recognizes the user's face position, and the control unit generates an image in which an arrangement of individual objects is changed so that the given object does not overlap the user's face area when it is detected as the shooting preparation movement of the user that shooting with the user as a subject is going to be performed.

(3)

The information processing apparatus according to (1) or (2) above, in which the control unit recognizes the user located near the presentation screen on the basis of a captured image of the presentation screen captured.

(4)

The information processing apparatus according to any one of (1) to (3) above, in which the control unit controls to push one or more objects that are presented, at least overlapping the recognition area including at least the user's face area, out of the recognition area.

(5)

The information processing apparatus according to any one of (1) to (4) above, in which the control unit controls to bring a specific object closer to the recognition area of the user, and move another object away from the recognition area of the user.

(6)

The information processing apparatus according to (5) above, in which the specific object is a high-priority object.

(7)

The information processing apparatus according to (6) above, in which the high-priority object is an object showing a given logo generated in advance, an object specified by the user, or an object of high popularity.

(8)

The information processing apparatus according to (7) above, in which the control unit performs presentation control to cause a presentation position of the object showing the given logo presented near the user's face area to follow movement of the user's face area.

(9)

The information processing apparatus according to (7) or (8) above, in which the control unit, when recognizing multiple users near the presentation screen, controls to present one object showing the specific logo to each group.

(10)

The information processing apparatus according to (9) above, in which the control unit determines whether or not the multiple users are in the same group, according to distance between the users.

(11)

The information processing apparatus according to any one of (1) to (10) above, in which the control unit detects a selfie taking movement by the user as the shooting preparation movement of the user.

(12)

The information processing apparatus according any one of (1) to (11) above, in which the control unit recognizes the user's face orientation, and the control unit detects, as the shooting preparation movement of the user, the user facing in a direction in which the presentation screen faces.

(13)

The information processing apparatus according any one of (1) to (12) above, in which the control unit detects, as the shooting preparation movement of the user, another user who is going to shoot the user as a subject.

(14)

The information processing apparatus according any one of (1) to (13) above, in which the presentation screen is a projected image, and the control unit generates an image in which the given object is placed not to overlap the recognition area of the user.

(15)

The information processing apparatus according to any one of (1) to (14) above, in which the control unit generates an image in which the one or more objects are arranged on the basis of times or locations.

(16)

The information processing apparatus according to any one of (1) to (15) above, in which the control unit generates an image in which the one or more objects are arranged randomly or according to drawing time or drawing location information.

(17)

An information processing method including:

a processor performing control according to a result of recognition of a user located near a presentation screen on which an object is presented, and a result of detection of a shooting preparation movement of the user, to present a given object such that the given object does not overlap a recognition area of the user.

(18)

A program for causing a computer to function as a control unit that performs control according to a result of recognition of a user located near a presentation screen on which an object is presented, and a result of detection of a shooting preparation movement of the user, to present a given object such that the given object does not overlap a recognition area of the user.

REFERENCE SIGNS LIST

3 Network
10 Information processing apparatus
20 Projector
30 Camera
40 Smart projector
50 Smartphone
100 Control unit
101 Drawn image management unit
102 Presentation image generation unit
103 Presentation control unit
104 Face position recognition unit
105 Situation recognition unit
110 Communication unit
120 Storage unit

The invention claimed is:

1. An information processing apparatus, comprising:
a control unit configured to control, based on a result of recognition of a user located near a presentation screen on which an object is presented, and a result of detection of a shooting preparation movement of the user, presentation of a given object such that the given object does not overlap a recognition area of the user.

2. The information processing apparatus according to claim 1, wherein the control unit is further configured to:
recognize a face position of the user, and
generate an image in which an arrangement of individual objects is changed so that the given object does not overlap a face area of the user, in a case where it is detected as the shooting preparation movement of the user that shooting with the user as a subject is going to be performed.

3. The information processing apparatus according to claim 1, wherein the control unit is further configured to recognize the user located near the presentation screen based on a captured image of the presentation screen.

4. The information processing apparatus according to claim 1, wherein the control unit is further configured to execute control to push one or more objects that are presented, at least overlapping the recognition area including at least a face area of the user, out of the recognition area.

5. The information processing apparatus according to claim 1, wherein the control unit is further configured to execute control to bring a first object closer to the recognition area of the user, and move a second object away from the recognition area of the user.

6. The information processing apparatus according to claim 5, wherein the first object is a high-priority object.

7. The information processing apparatus according to claim 6, wherein the high-priority object is one of an object showing a given logo generated in advance, an object specified by the user, or an object of high popularity.

8. The information processing apparatus according to claim 7, wherein the control unit is further configured to execute presentation control to cause a presentation position of the object showing the given logo presented near a face area of the user to follow movement of the face area.

9. The information processing apparatus according to claim 7, wherein the control unit is further configured to control, based on recognition of multiple users near the presentation screen, presentation of one object showing the given logo to each group.

10. The information processing apparatus according to claim 9, wherein the control unit is further configured to determine whether the multiple users are in the same group, based on distance between the multiple users.

11. The information processing apparatus according to claim 1, wherein the control unit is further configured to detect a selfie taking movement by the user as the shooting preparation movement of the user.

12. The information processing apparatus according to claim 1, wherein the control unit is further configured to:
recognize a face orientation of the user, and
detect, as the shooting preparation movement of the user, the user facing in a direction in which the presentation screen faces.

13. The information processing apparatus according to claim 1, wherein the control unit is further configured to detect, as the shooting preparation movement of the user, a specific user who is going to shoot the user as a subject.

14. The information processing apparatus according to claim 1, wherein
the presentation screen is a projected image, and
the control unit is further configured to generate an image in which the given object is placed not to overlap the recognition area of the user.

15. The information processing apparatus according to claim 1, wherein the control unit is further configured to generate an image in which one or more objects including the object are arranged based on a times or locations.

16. The information processing apparatus according to claim 1, wherein the control unit is further configured to generate an image in which one or more objects including the object are arranged one of randomly or based on at least one of drawing time information or drawing location information.

17. An information processing method, comprising:
controlling, by a processor, based on a result of recognition of a user located near a presentation screen on which an object is presented, and a result of detection of a shooting preparation movement of the user, presentation of a given object such that the given object does not overlap a recognition area of the user.

18. A non-transitory computer-readable medium having stored thereon, computer executable-instructions that, when executed by a processor, cause the processor to execute operations, the operations comprising:
controlling, based on a result of recognition of a user located near a presentation screen on which an object is presented, and a result of detection of a shooting preparation movement of the user, presentation of a given object such that the given object does not overlap a recognition area of the user.

* * * * *